（12）United States Patent
Miyazawa

(10) Patent No.: US 6,411,285 B1
(45) Date of Patent: Jun. 25, 2002

(54) TOUCH-PANEL INPUT TYPE ELECTRONIC DEVICE

(75) Inventor: Tomokazu Miyazawa, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/514,301

(22) Filed: Feb. 28, 2000

(30) Foreign Application Priority Data

Mar. 17, 1999 (JP) .......................................... 11-072072

(51) Int. Cl.⁷ ................................................. G09G 5/00
(52) U.S. Cl. ...................................... 345/173; 345/178
(58) Field of Search .............................. 345/173, 174, 345/175, 176, 177, 178, 179, 156, 157, 87, 103; 178/18.01, 18.02, 18.1

(56) References Cited

U.S. PATENT DOCUMENTS 5,565,894 A * 10/1996 Bates et al. .................. 345/178

FOREIGN PATENT DOCUMENTS

| JP | A348318 | 3/1991 |
| JP | A10207632 | 8/1998 |

* cited by examiner

*Primary Examiner*—Xiao Wu

(57) ABSTRACT

A displacement between an input point on a touch-sensitive panel and a display point on a display panel must be reliably corrected by a simple, inexpensive structure. A transparent touch-sensitive panel having a coordinate system formed on its surface for locating the position of a point input and a LCD panel having a coordinate system for locating the position of a display point corresponding to the input point on the touch-sensitive panel are laminated together and swingably attached to a main body. A rotation angle of the touch-sensitive panel and the LCD panel with respect to the main,body is detected by an angle detector. The abscissa and ordinate values of an input point in the coordinate system of the touch-sensitive panel are corrected according to a rotation angle detected by the angle detector and a distance between the surfaces of two panels and displayed in the display coordinate system of the LCD panel.

3 Claims, 6 Drawing Sheets

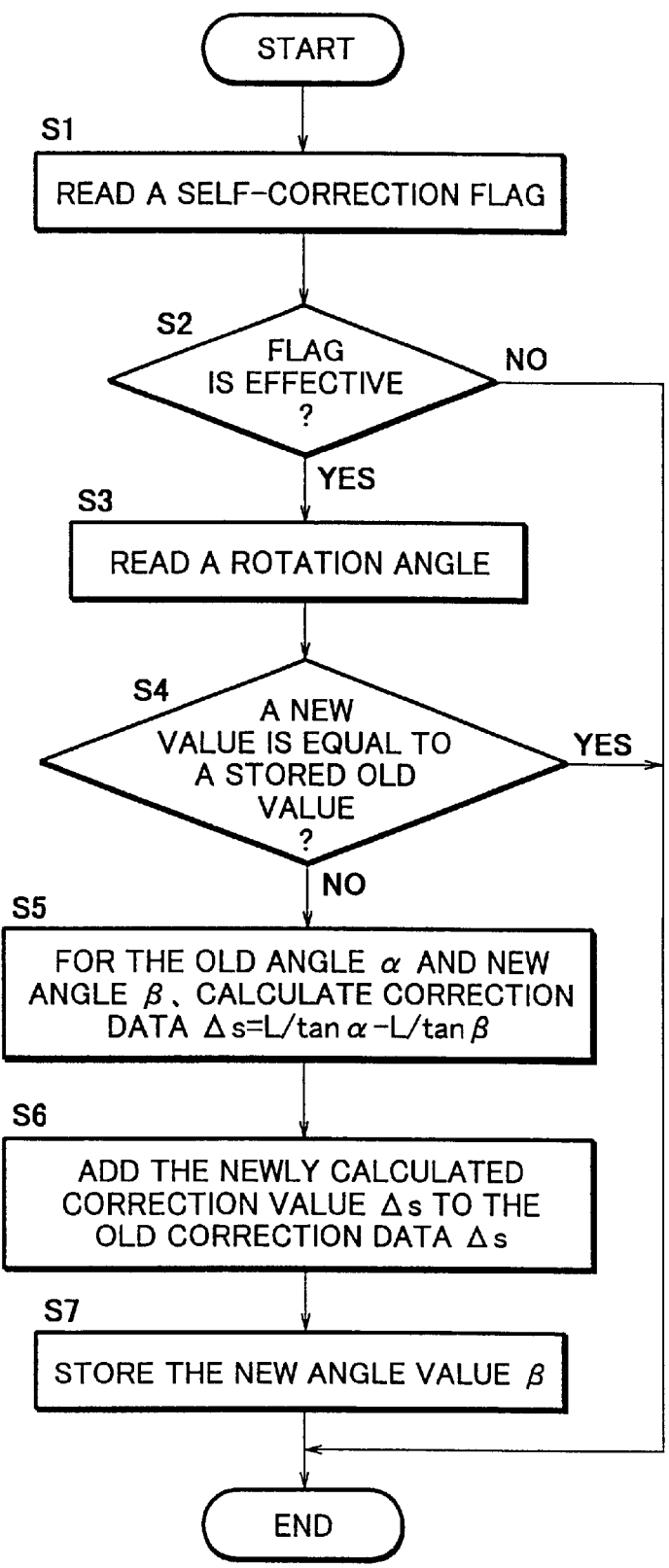

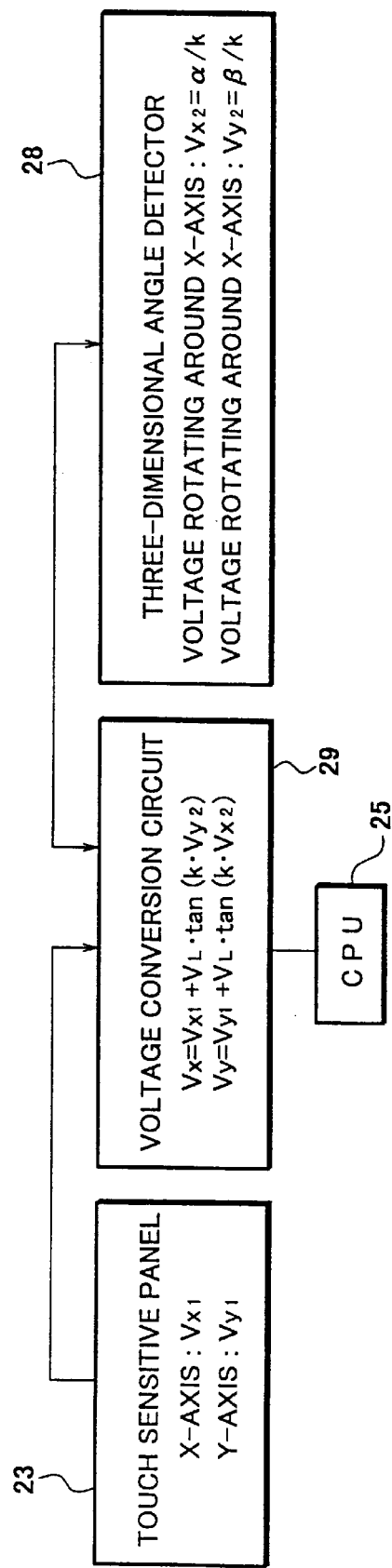

TOUCH-PANEL INPUT TYPE ELECTRONIC DEVICE

BACKGROUND OF THE INVENTION

The present invention relates to a touch-panel input type electronic device that has a touch panel which is a touch-sensitive panel with a point-input coordinate system formed on its surface and a display pnel for displaying coordinate data of a point corresponding to a point input to the touch panel, both the panels are laminated together.

A coordinate touch-input-and-display device composed of a LCD display panel on which a touch-sensitive panel made of resistive film is superimposed, is widely applied in various kinds of electronic apparatuses such as electronic cash-registers, word processors, portable information terminals and so on. Since a point-input coordinate system formed on the input-sensitive panel is matched with a display-side coordinate system formed on a front surface of the LCD display device, this coordinate touch-input-and-display system can display a touch-point inputted through the touch-sensitive panel as a point in the display-side coordinate system of the LCD display panel, which can be seen through the touch-sensitive panel.

However, the touch-sensitive panel laminated on the LCD display screen has a suitable spacing from the display screen surface and may therefore cause an observer to have a parallax when viewing the input point on the display screen through the transparent touch-sensitive panel at an angle thereto. Namely, a displacement may occur between the touch-inputted point and the displayed point especially often while observing an image on the screen of the coordinate touch-and-display panel swingably attached to the electronic apparatus. In other [word] words inclining the touch-and-display panel of the apparatus may always be accompanied by an apparent displacement of a displayed point from a touch-inputted point due to parallax.

There have been several attempts to solve the above problem. For example, Japanese Laid-Open Patent Publication No.3-48318 discloses an electronic apparatus having a mechanism for sliding a touch-sensitive panel against a display panel according to an inclination of the display panel with respect to the apparatus main body every time when the panel is swung at a desired viewing angle.

Japanese Laid-Open Patent Publication No.10-207632 discloses a linkage mechanism by which a LCD panel and a touch-sensitive panel are linked with each other in such a way that changing inclination of the LCD display panel with respect to the horizontal plane is always followed by automatic adjustment of the inclination of the touch-sensitive panel.

The mechanism for sliding the touch-sensitive panel against the display panel according to an inclination of the latter with respect to the apparatus main body as disclosed in Japanese Laid-Open Patent Publication No.3-48318 may be so complicate that it may provably increase the overall size of the apparatus, resulting in increasing manufacturing expense of the apparatus.

The link mechanism for linking the touch-sensitive panel with the LCD panel as proposed in Japanese Laid-Open Patent Publication No.10-207632 may probably increase the overall size of the apparatus, resulting in increasing manufacturing expense of the apparatus.

In addition, the link mechanism cannot tilt the touch-sensitive panel and the LCD panel over a certain limit angle.

Furthermore, both apparatuses use mechanical joints between the touch-sensitive panel and the display panel, which may therefore have such a common problem that any displacement is irrevocably compensated even when it has no need to be compensated.

SUMMARY OF THE INVENTION

The object of the present invention is to provide a touch-panel input type electronic device that is simple and inexpensive and can reliably compensate an apparent displacement of a point display on the display panel from a touch-inputted point on the touch-sensitive panel.

Another object of the present invention is to provide a touch-panel input type electronic device that has a touch-and-display panel composed of a double layered panel, one being a transparent touch-sensitive panel having a touch-point-input coordinate system provided on its surface for locating a touch input point thereon, and the other being a display panel having a point display coordinate system for locating a display point corresponding to coordinate values of an input point on the touch-sensitive panel, and swingably attached to the device main body and is characterized by further including means for sensing an inclination angle of the touch-sensitive panel and the display panel with respect to the main body and correction control means for correcting coordinate values of a touch point inputted through the touch-sensitive panel on the basis of the sensed inclinations of the panels and displaying the corrected coordinate values of the inputted point on the display panel.

Another object of the present invention is to provide a touch-panel input type electronic device that is similar to the above-mentioned device but is further provided with a function to cancel the above correction control.

A further object of the present invention is to provide a touch-panel input type electronic device that has a touch-and-display panel composed of a transparent touch-sensitive input panel having a touch-point-input coordinate system and being superimposed over a surface of a display panel having a point display coordinate system, and fixedly attached to the device main body and is characterized by further including means for sensing an inclination angle of the touch-sensitive panel and the display panel with respect to the horizontal plane and correction control means for correcting a coordinate value of a touch point made on the touch-sensitive panel on the basis of the sensed inclination angle of the panels and a predetermined distance between them and displaying the corrected coordinate value of the inputted point on the display panel.

BRIEF DESCRIPTION OF THE DRAWINGS

FIG. 3 is a flowchart depicting the operation of the touch-panel input type electronic device of FIG. 1.

FIG. 7 is a flowchart depicting the operation of the touch-panel input type electronic device of FIG. 5.

PREFERRED EMBODIMENT OF THE INVENTION

Referring to the accompanying drawings, a preferred embodiment of the present invention will be described bellow in detail.

Figure 1:
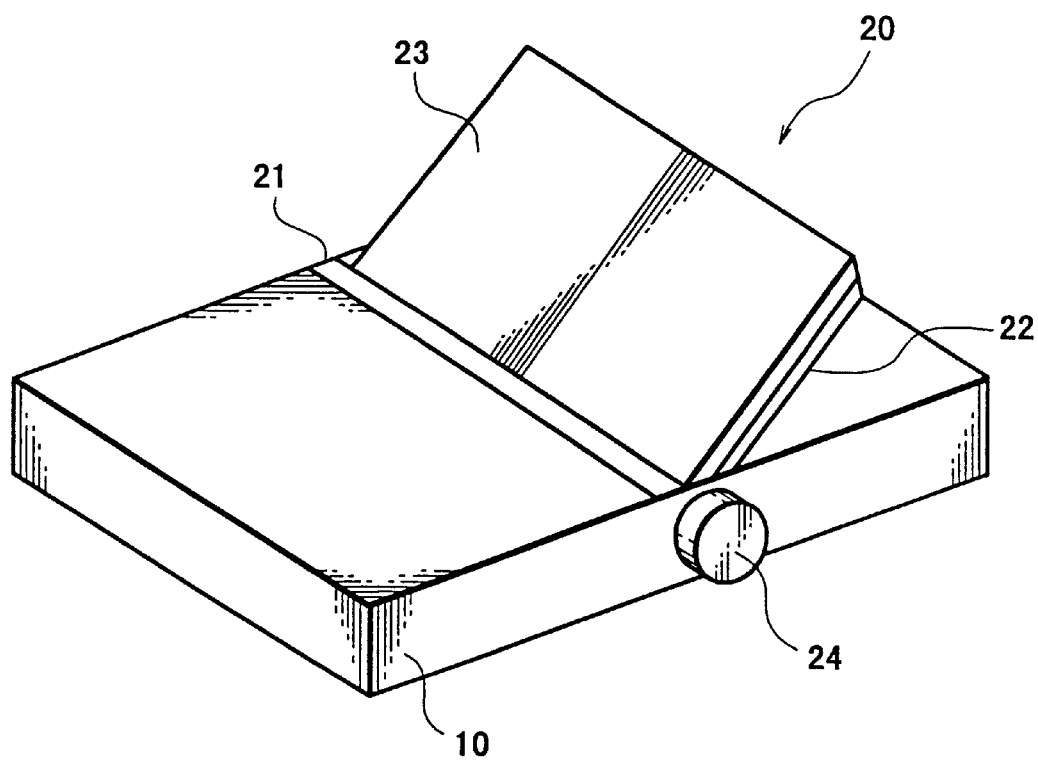
FIG. 1 is a schematic perspective view of a touch-panel input type electronic device according to an aspect of the present invention.

FIG. 1 is a schematic perspective view of a touch-panel input type electronic device according to an embodiment of the present invention. This touch-panel input type electronic device can be applied to a variety of electronic apparatuses such as electronic cash registers, word processors, portable information terminals and so on. As shown in FIG. 1, this electronic device is composed of a flat-case-shaped main body 10 and a flat-panel-shaped coordinate touch-input-and-display unit 20 disposed for covering a top surface of a half longitudinal portion of the main body.

The coordinate touch-input-display unit 20 is sized to cover a top surface of a substantially half portion in the longitudinal direction of the main body 10. The other half portion has a (stepped) cut end transversely disposed at a substantially center in the longitudinal direction of the main body 10. A rotation shaft 21 of the coordinate touch-input-display unit 20 is disposed along the above transverse end of the other half portion of the main body 10. This rotation shaft 21 of the coordinate touch-input-display unit 20 is rotatably attached to the top surface of the main body 10.

The coordinate touch-input-display unit 20 comprises a liquid crystal display (LCD) panel 22 with a touch-sensitive panel (touch panel) 23 integrally laminated thereon, which laminar panel portions are integrally attached to the rotation shaft 21. Accordingly, the touch-sensitive panel 23 and the LCD display panel 22 are integrally rotated around a axis of the rotation shaft 21. Namely, the rotation shaft 21 rotates together with the two panels 22 and 23.

The rotation shaft 21 is provided at its one end with an inclination angle detector 24 for detecting an inclination angle of the touch-sensitive panel 23 and the LCD-display panel 22 with respect to the main body 10 according to a rotational movement value of the rotation shaft. This detector 24 is composed of, e.g., a volume resistance fixed to the main body 10, which can vary resistance value in response to the rotational movement of the touch-sensitive panel 23 and the LCD panel 22. The detector 24 can thus output a voltage value corresponding to a change in its rotation-sensitive resistance value.

The touch-sensitive panel 23 is a transparent tablet having a two-dimensional (X-Y) coordinate system formed on its surface, which is sensitive to a touch (input point) of a stylus pen or the like and outputs/voltages corresponding to values of ordinate and abscissa respectively of the input point.

The LCD panel 22 with a touch-sensitive panel 23 superimposed thereon has a two-dimensional (X-Y) coordinate system formed on its surface, which matches with that formed on the touch-sensitive panel 23. The LCD panel can therefore display a point inputted through the touch-sensitive panel 23 as a point in its X-Y coordinate system according to the output voltages from the touch-sensitive panel 23.

Figure 2:
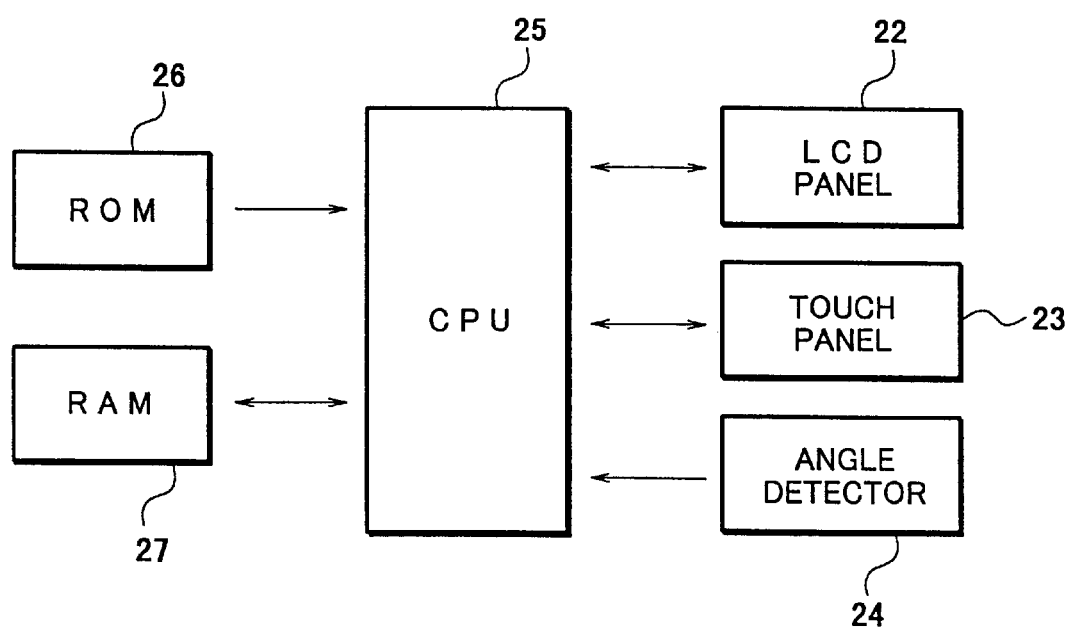
FIG. 2 is a block diagram of a control system of the touch-panel input type electronic device of FIG. 1.

FIG. 2 is a block diagram of a control system of a touch-panel input type electronic device embodying the present invention. In this device, a central processing unit (CPU) 25 controls a whole system of the electronic device and is connected to the LCD panel 22, touch-sensitive panel 23 and the inclination angle detector 24 respectively. The CPU 25 is also connected with a read-only-memory (ROM) 26 for storing microinstruction to control the functioning of the LCD panel 22, the touch-sensitive panel 23 and the inclination angle detector 24, fixed messages and correction data and so on, and a random access memory (RAM) 27 for storing self-correcting data, inclination angle data and correction data and so on.

The LCD panel 22 can also display key-image data, input data, error display data and operation guide data besides a display point corresponding to a touch-inputted point on the touch-sensitive panel 23.

Referring to a flowchart of FIG. 3, the operation of the thus constructed touch-panel input type electronic device will be described below.

Once the power was turned on, a self-correction flag is first read-in, which flag will be set at the time of executing automatic correction of coordinates of a display point on the LCD display panel 22 in response to a point input to the touch-sensitive panel 23 according to an output of the inclination angle detector 24, which output is an inclination angle formed between the both panels 22 and 23 with respect to the main body 10 (Step S1 of FIG. 3). The self-correction flag is selectively read-in only in the case of conducting the self-correction of the display point, i.e., it can be disabled by operating a correction-control canceling switch (not shown) provided on the main body 10. When this flag is disabled, the self-correction cannot be carried out.

The read-in self-correction flag is recognized to be effective and not disabled by the canceling switch (Step S2). With ineffective flag, i.e., disabled by the canceling switch, the self-correction is recognized to be unnecessary and shall not be conducted.

After this, the rotation angle θ of the LCD panel 22 and the touch-sensitive panel 23 with respect to the main body 10 based on the output voltage of the inclination angle detector 24 is read-in (Step S3). The just read-in rotation angle is then checked whether it is matched or mismatched with a value stored as the rotation angle of the LCD panel 22 and the touch-sensitive panel 23 (Step S4). If the just read-in value matched with the stored value, the CPU 25 recognizes that the self-correction data has: been already stored and finishes the self-correction of the display coordinate system of the LCD panel 22.

If the just read-in value of the rotation angle did not agree with the stored value, the CPU 25 calculates correction value Δs from the preceding rotation angle value α, a just read-in rotation angle value β and a predetermined distance L from the touch-sensitive panel surface to the LCD panel surface according to the equation (1):

$$\Delta s = L/\tan \alpha - L/\tan \beta \quad (1)$$

Figure 4A:
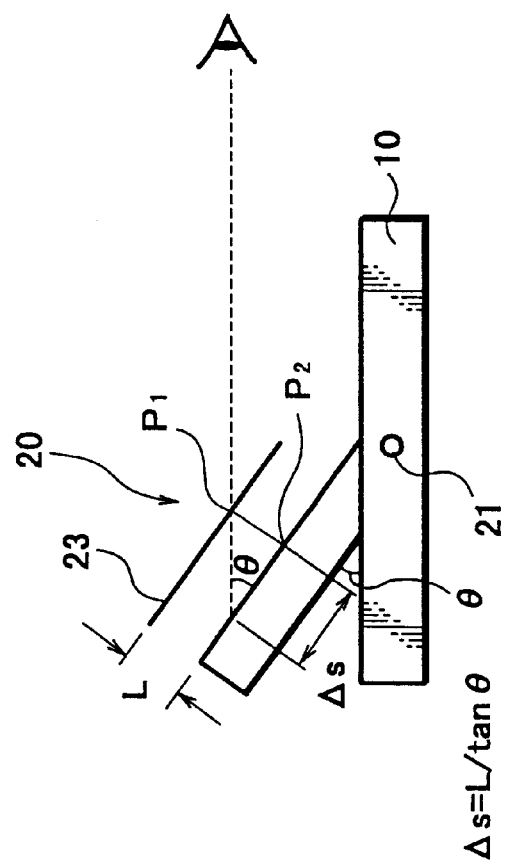
FIGS. 4A and 4B are schematically illustrative of the operation principle of the touch-panel input type electronic device of FIG. 1.

Referring to FIG. 4, the correction data Δs is explained as follows:

When the LCD panel 22 and the touch-sensitive panel 23 are turned to a position being normal (at a rotation angle θ of 90 deg.) to the main body 10 of the electronic device as seen in FIG. 4A, a horizontal line from the observer eye is perpendicular to the surfaces of the LCD panel 22 and touch-sensitive panel 23. In this case, no parallax occurs between an input point on the touch-sensitive panel surface 22 and a display point on the LCD panel surface irrespective of a distance L between their surfaces. Namely, the input point and the display point are coincident to each other.

Figure 4B:
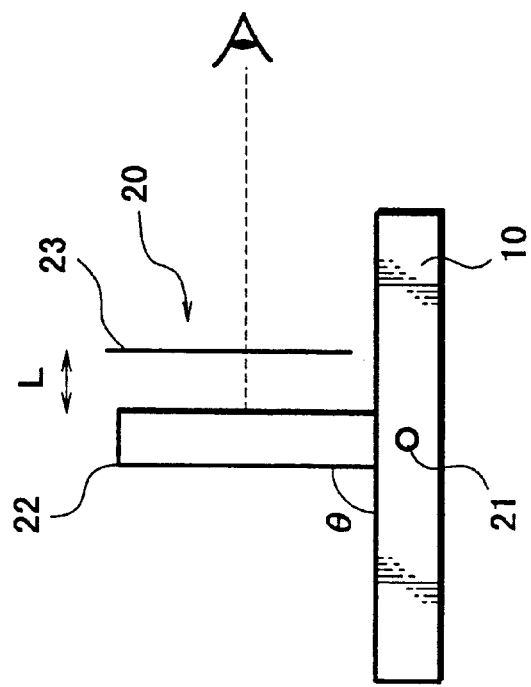

When the LCD panel 22 and the touch-sensitive panel are turned by an angle θ(≠90°) with respect to the main body as shown in FIG. 4B, a viewing line being parallel to the main body 10 has an inclination angle θ to the touch-sensitive panel surface. Therefore, a parallax by an distance Δs is produced between an input point $P_1$ on the touch panel surface 23 and a display point $P_2$ on the LCD panel surface 22. The distance $\Delta s$ is expressed as follows:

$$\Delta s = L/\tan \theta \qquad (2)$$

The above distance is calculated as correction data $\Delta s$.

The calculated correction data $\Delta s$ is added to a preceding correction data, if such data has previously computed and stored, and a result of the addition is stored as a new correction data instead of the preceding data (Step S6). The new rotation angle $\beta$ is also stored (Step S7).

Since no data of rotation angle of the LCD panel 22 and the touch-sensitive panel 23 has been stored in the initial stage of the self-correction control, the correction data $\Delta s$ is computed on the basis of a newly read-in rotation angle $\alpha$ and stored together with the angle $\alpha$.

Once the new correction data $\Delta s$ is stored, the values of the abscissa and the ordinate of a display point on the LCD panel 22, are determined from output voltages representing the values of the abscissa and the ordinate of an input point on the touch-sensitive panel 23 and then corrected by adding the stored correction data $\Delta s$ to the respective values. The coordinate values corrected by adding the correction data $\Delta s$ relate to the corrected position of the display point in the X-Y coordinate system on the LCD panel 22.

Once a rotation angle a of the LCD panel 22 and the touch-sensitive panel 23 was stored at an initial stage of the self-correction control, correction data As of the newly detected rotation angle $\beta$ is then calculated from a difference between the correction data of the stored rotation angle $\alpha$ and $\beta$ according to Equation (2). The newly calculated correction data $\Delta s$ is added to a preceding correction data $\Delta s$ to obtain new current correction data $\Delta s$ to be stored in replace of the preceding correction data. After this, the same control is repeated at specified intervals or every time when a change in the output of the inclination angle detector 24.

A corrected display point on the LCD panel 22 is positioned on the viewing line being parallel to the main body 10 as shown in FIG. 4B. Namely, the self-correction can eliminate the apparent parallax (displacement) of the display point on the LCD panel 22 from the input point on the touch-sensitive panel 23 when the panels has been turned by the angle $\theta$ to the main body.

The self-correction control can be turned off by operating a canceling switch. This feature is provided because the self correction of coordinate values of the display point becomes unnecessary after placing the LCD panel 22 and the touch-sensitive panel 23 in a certain fixed position wherein parallax cannot be caused.

Figure 5:
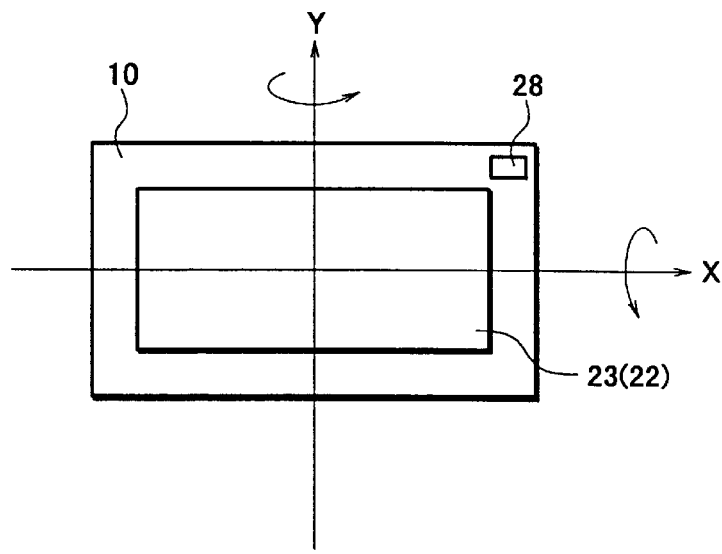
FIG. 5 is a schematic plan view of a touch-panel input type electronic device according to another aspect of the present invention.

FIG. 5 is a plan view of a touch-panel input type electronic device that is another embodiment of the present invention. This touch-panel input type electronic device has a coordinate input-and-display unit 20 integrally secured to its main body 10. The coordinate input-and-display unit 20 is composed of an LCD panel 22 with a touch-sensitive panel 23 laminated thereon as described before for the first embodiment. In the electronic device, the coordinate input-and-display unit 20 is provided with a three-dimensional angle detector 28 disposed at a corner of the main body 10. This detector 28 can detect an inclination angle of the coordinate input-and-display unit 20 with respect to the horizontal plane as rotation angles in two directions perpendicular to each other. For example, the detector outputs two voltage values corresponding to rotation angle values in X- and Y-directions of the touch-sensitive panel 23.

Figure 6:
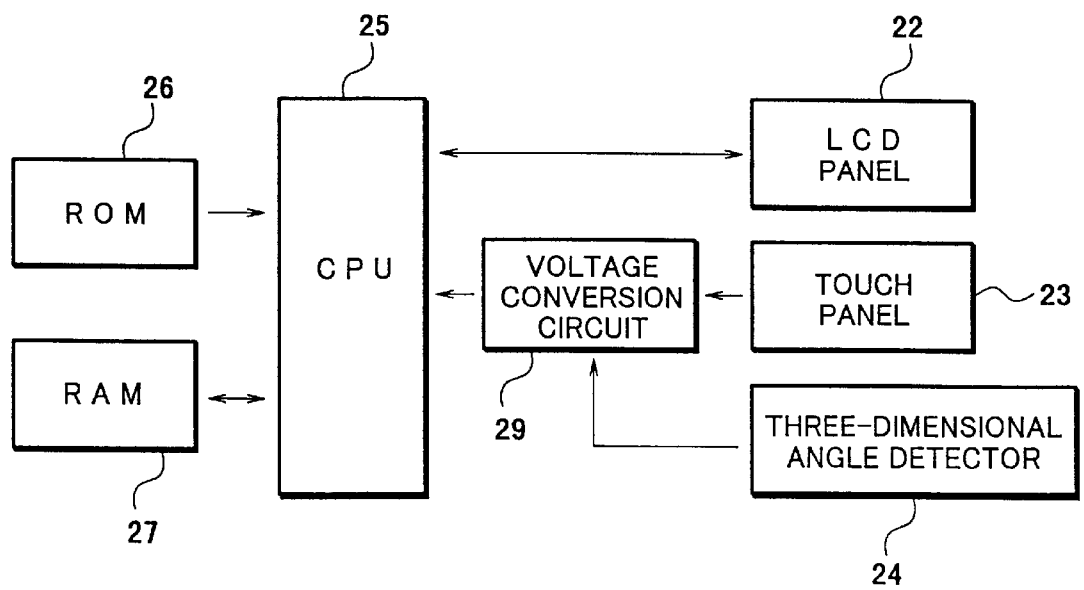
FIG. 6 is a block diagram of a control system of the touch-panel input type electronic device of FIG. 5.

FIG. 6 is a block diagram of a control system of the touch-panel input type electronic device in the embodiment of FIG. 5 according to the present invention. In the touch-panel input type electronic device, an output voltage of the touch-sensitive panel 23 and an output voltage of the three-dimensional angle detector 28 are inputted to a voltage conversion circuit 29, outputs of which are then inputted to a central processing unit (CPU) 25. The other components are similar to those of the electronic device control system shown in FIG. 2.

In the shown embodiment, the touch-sensitive panel 23 recognizes a touch-inputted point in the coordinate system of its surface and generates two output voltages $V_{x1}$ and $V_{y1}$ representing the values of the abscissa and the ordinate of the input point. These outputs are transferred to the voltage conversion circuit 29. The three-dimensional angle detector 28 also generates two output voltages $V_{x2}$ and $V_{y2}$ representing rotation angle value rotation angle values $\alpha$ and $\beta$ around X and Y axes, respectively, of the LCD panel 22 and the touch-sensitive panel 23. These outputs are also transferred to the voltage conversion circuit 29. In this instance, the output voltages $V_{x2}$ and $V_{y2}$ of the three-dimensional angle detector 29 are inversely proportional to the rotation angle values $\alpha$ and $\beta$, respectively, around X- and Y-axes (with a proportional constant k).

The voltage conversion circuit 29 generates the corrected voltage values $V_x$ and $V_y$ representing the corrected values of the abscissa and the ordinate of the display point on the LCD panel 22 on the basis of the voltage values $V_{x1}$ and $V_{y1}$ from the touch-sensitive panel 22 and the voltage values $V_{x2}$ and $V_{y2}$ from the three-dimensional angle detector 29, and outputs the corrected voltage values $V_x$ and $V_y$ to the CPU 25.

In the voltage conversion circuit 29, the corrected voltage value $V_x$ corresponding the corrected value of the abscissa of the display point is determined on the basis of the output voltage $V_{x1}$ of the touch-sensitive panel 23, which represents the value of the abscissa of the touch inputted point thereon, and the output voltage $V_{y2}$ of the three-dimensional angle detector 29, which value represents the angle $\beta$ of rotation around Y axis of the LCD panel 22 and the touch-sensitive panel 23. Assuming that L is a distance from the touch-sensitive panel surface 23 to the LCD panel surface 22, $V_L$ is a potential corresponding to the distance L in the coordinate system of the LCD panel 22 and the values of abscissa and the ordinate of a point in the coordinate system of the LCD panel 22 are in proportion to display voltages with a proportional constant k, a corrected voltage-for a display point is determined as follows:

$$V_x = V_{x1} + V_L \cdot \tan(k \cdot V_{y2}) \qquad (3)$$

Similarly, the corrected voltage $V_y$ representing a corrected value of the ordinate of a display point in the coordinate system on the LCD panel 22 is calculated on the basis of the output voltage $V_{y1}$ of the touch-sensitive panel 23, which represents the value of the ordinate of the touch-point input thereto, and the output voltage $V_{x2}$ of the three-dimensional angle detector 29, which value represents the angle $\alpha$ of rotation around X axis of the LCD panel 22 and the touch-sensitive panel 23. It is calculated according to the following equation (4)

$$V_Y = V_{Y1} + V_L \cdot \tan(k \cdot V_{x2}) \qquad (4)$$

The voltage conversion circuit 29 thus determines the corrected display voltages $V_x$ and $V_y$ representing the values of abscissa and the ordinate of a display point (position) in the coordinate system on the LCD panel 22 and outputs the determined corrected voltages to the CPU 25 that in turn applies the received corrected voltages Vx and Vy to the LCD panel 22. The corrected point corresponding to X-axis and Y-axis rotation angles α and β with respect to the input point on the touch-sensitive panel 23 is thus displayed on the LCD panel 22. This eliminates the possibility of causing the parallax between an input point on the touch-sensitive panel 23 and a display point on the LCD panel 22 even when vertically viewing the LCD panel 22 and the touch-sensitive panel 23 both of which are placed at an inclination angle to the horizontal plane.

The touch-panel input type electronic devices according to the present invention can display on its display screen a display point whose abscissa and ordinate values are determined based on inclination of the display panel and touch-sensitive panel with respect to the main body or the horizontal plane. Therefore, the devices are simple and small and can be manufactured at a low expense.

What is claimed is:

1. A touch-panel input type electronic device comprising:

a touch-and-display panel swingably attached to its main body, said touch-and-display panel being a double layered panel, one layer being a transparent touch-sensitive panel having an input coordinate system. provided on its surface for locating a touch input point thereon and the other layer being a display panel having a display coordinate system for locating a display point corresponding to coordinate values of an input point on the touch-sensitive panel;

an angle detecting means for detecting a rotation angle of the touch-and-display panel with respect to the main body, and a correction control means for correcting coordinate values of a touch input point on the touch-sensitive panel on the basis of a rotation angle detected by the angle detecting means and a predetermined distance between the touch-sensitive panel and the display panel and displaying the corrected coordinate values of the touch input point in the coordinate system of the display panel.

2. A touch-panel input type electronic device as defined in claim 1, wherein the correction control means is provided with a canceling function for use when the correction control is unnecessary to apply.

3. A touch-panel input type electronic device comprising:

an input touch-and-display panel fixedly attached to its main body, said touch-and-display panel being a double layered panel, one layer being a transparent touch-sensitive panel having a input coordinate system provided on its surface for locating a touch input point thereon and the other layer being a coordinate display panel having a display coordinate system for displaying thereon coordinate values of an input point on the touch-sensitive panel, an angle-detecting means for detecting an inclination angle of the touch-and-display panel with respect to a horizontal plane, and a correction control means for correcting the coordinate values of a touch-inputted point on the touch-sensitive panel on the basis of a rotation-angle detected by the angle detecting means and a predetermined distance between the touch-sensitive panel and the display panel and displaying corrected coordinate values of the touch-inputted point in the coordinate system of the display panel.

* * * * *